United States Patent Office 2,965,595
Patented Dec. 20, 1960

2,965,595

PROCESS FOR POLYMERIZING TETRAFLUORO-ETHYLENE IN THE PRESENCE OF POLYMER-STABILIZING AGENTS

Keith Clark Brinker and Manville Isager Bro, Wilmington, Del., assignors to E. I. du Pont de Nemours and Company, Wilmington, Del., a corporation of Delaware No Drawing. Filed Dec. 5, 1955, Ser. No. 550,854

6 Claims. (Cl. 260—29.6)

This invention relates to the polymerization of tetrafluoroethylene, and more particularly to a process for preparing improved polymers of tetrafluoroethylene and aqueous colloidal dispersions of polytetrafluoroethylene.

Polytetrafluoroethylene is well known for its inertness to temperature and corrosive chemicals and its mechanical and electrical properties. Although the physical properties of the polymer remain unchanged by continuous heating at high temperatures, minor degradation occurs, resulting in the formation of toxic gases. Because of these toxic gases, areas in which polytetrafluoroethylene is heated to above its sintering temperature must be well ventilated, thus adding to the cost of the polymer fabrication. Modification of the polymer to overcome this disadvantage is very difficult for two reasons. The polymer itself is chemically inert to almost all reagents, but the growing polymer chain is highly reactive and is terminated at a low molecular weight stage by reaction with many organic compounds even when present in the reaction phase in only small quantities. Highly fluorinated compounds are the only class of organic compounds known to be inert. Waxy or liquid reaction products consisting of an organic radical and short tetrafluoroethylene polymer chains are obtained when tetrafluoroethylene is polymerized in the presence of organic compounds in the reaction phase as disclosed in U.S. Patents 2,411,158 and 2,411,159, both issued November 19, 1946, to William E. Hanford; U.S. Patent 2,462,402 issued on February 22, 1949, to Robert M. Joyce; and U.S. Patent 2,540,088 issued February 6, 1951, to Paul L. Barrick.

The polymerization of tetrafluoroethylene to form aqueous colloidal dispersions has been accomplished by polymerizing tetrafluoroethylene in an aqueous medium in the presence of particular peroxide catalysts, such as disuccinic acid peroxide as disclosed in U.S. Patent 2,534,058 issued to Malcolm M. Renfrew on December 12, 1950. The process was found to be improved by the addition of fluoroalkyl carboxylates as dispersing agents and saturated hydrocarbons not soluble in the reaction phase as anti-coagulants. However, the resulting dispersions still require the addition of a second dispersing agent after polymerization to obtain good stability against coagulation by agitation.

It is, therefore, the objective of the present invention to improve the thermal stability and to decrease the toxicity of polytetrafluoroethylene at elevated temperatures. It is a further object of the present invention to improve the stability of aqueous dispersions of polytetrafluoroethylene against coagulation. Another object is to provide an improved process for preparing aqueous colloidal dispersions of polytetrafluoroethylene. Other objects will become apparent hereinafter.

The objects of the present invention are accomplished by polymerizing tetrafluoroethylene in an aqueous medium in the presence of 0.01 to 10 mol percent of the monomer of a compound of the class consisting of hydrogen, methane, ethane and saturated fluorinated hydrocarbons having not more than 2 carbon atoms and at least one hydrogen atom, wherein the quantity of the additive employed is from 0.01 to 0.05 mol percent when the compound contains 6 hydrogen atoms, from 0.01 to 0.5 mol percent when the compound employed contains less than 6 and more than 3 hydrogen atoms, from 0.01 to 2.5 mol percent when the compound employed contains less than 4 and more than 1 hydrogen atom, and from 0.01 to 10 mol percent when the compound employed contains 1 hydrogen atom. In a preferred embodiment of the present invention tetrafluoroethylene is polymerized in an aqueous medium to a dispersion of colloidal polytetrafluoroethylene by methods disclosed in the prior art in the presence of one of the polymer modifiers listed hereinabove.

It was discovered that the above-disclosed compounds, if added to the polymerization of tetrafluoroethylene in quantities within the limits set forth, substantially reduce the toxicity of the resulting polymer at temperatures above the sintering temperature, increase the thermal stability of the polymer, and, when used in a dispersion process, increase the stability of the resulting polytetrafluoroethylene dispersion against coagulation. It is believed that under the conditions of the present invention hydrogen, methane, ethane and fluorinated hydrocarbons having not more than 2 carbon atoms and at least one hydrogen such as monofluoromethane, difluoromethane, trifluoromethane and difluoroethane, cap the reactive ends of essentially high molecular weight polymer chains, thereby forming a slightly modified polytetrafluoroethylene which is surprisingly improved in thermal stability. In the polymerization to form aqueous dispersions of polytetrafluoroethylene, it is believed that the stabilizing agents aid in the formation of smaller colloidal particles and thus enhance the stability of the dispersion against coagulation.

The modified polymers produced by the present invention have the same outstanding physical, mechanical, electrical and chemical properties of the unmodified polymers and are not to be compared to the low molecular weight brittle and waxy polymers obtained by the prior art polymerization of tetrafluoroethylene in the presence of organic compounds. Although it may be said that the additives of the present invention are also chain-transfer or chain-terminating agents, it is not a suppression of growth of the polymer chain which comes into play in the process of the present invention, but rather the improvement obtained from the formation of a bond between the additive and the tetrafluoroethylene polymer chain. The compounds employed in the present invention are therefore considered to be stabilizing agents rather than chain-transfer agents.

The polymerization of tetrafluoroethylene according to the present invention is critical with regard to the quantity of the additive present in the polymerization zone. Since the polymer modifiers of the present invention are also chain-transfer agents, they will affect the rate of polymerization and the degree of polymerization obtained in the product. It was found that within the limits set forth the additives have no significant effect on the degree of polymerization as can be measured by the physical and chemical properties of the polymer. Although the rate of polymerization is somewhat decreased through the addition of the modifiers of the present invention, the rate is not decreased to such an extent that the polymerization becomes uneconomical. Since tetrafluoroethylene is a highly reactive monomer which polymerizes very rapidly, it is in many instances desirable to decrease the rate of polymerization in order to establish a better control over the reaction. The optimum amounts of the modifiers of the present invention to be added will vary from compound to compound and depend, among other factors, on the reactivity of the hydrogen, the polymerization temperature, and the number of hydrogens in the compound employed. Higher molecular weight hydrocarbons, particularly those containing methylene groups and hydrocarbons containing halogens other than fluorine such as chlorine, rapidly react with growing polytetrafluoroethylene chains to inhibit the polymerization of tetrafluoroethylene and give rise to low molecular weight polymers unsuitable for fabrication, even when employed in very small quantities. Furthermore, the incorporation of higher molecular weight hydrocarbons in the polymer chain gives rise to excessive gas formation during fabrication of the polymer. Thus, rather than improving, the higher hydrocarbons lower the thermal stability of the polymer.

The preferred modifiers of the present invention are hydrogen and methane. These modifiers are low in cost, readily available and only small quantities are required to achieve the desired stability and decrease in toxicity of polytetrafluoroethylene.

The stabilizing agents may be added to the reaction mixture prior to the polymerization or during the polymerization of tetrafluoroethylene. The preferred method is the addition prior to the polymerization, since a better control over the quantities added is thus possible.

The polymerization of tetrafluoroethylene according to the process of the present invention is carried out in accordance with known general procedures. Pressures of 1 to 1000 atmospheres and temperatures from 0 to 100° C. are normally used. Preferred initiators are water-soluble peroxygen compounds such as ammonium persulfate, disuccinic acid peroxide, tertiary butyl peroxide among others. Redox polymerization initiators such as sodium bisulfite with ferricitrophosphates may also be employed as polymerization initiators in the present invention. The quantity of catalyst may be varied over a wide range depending on polymerization rates and polymerization degrees desired; generally from 0.01 to 5% of initiator by weight of the aqueous medium is added.

In carrying out the process of the present invention, to obtain aqueous colloidal dispersions of polytetrafluoroethylene there is preferably added to the polymerization mixture a dispersing agent and an anti-coagulant. Outstanding dispersing agents are such fluoroalkyl compounds as ammonium dodecafluoroheptanoate, ammonium perfluorocaprylate and others as disclosed in U.S. Patent 2,559,752, issued to Kenneth L. Berry on July 10, 1951. The preferred concentration of the dispersing agent is from 0.1% to 3% of the aqueous medium. The anti-coagulants employed in the present invention are saturated hydrocarbons having more than 12 carbon atoms in the chain, such as mineral oils, or paraffins which are liquid at polymerization temperatures. The anti-coagulant encases coagulating polymer and thus stops further coagulation. The hydrocarbon does not interfere in the polymerization of tetrafluoroethylene since it is insoluble in the reaction phase, and thus does not come in contact with the growing polymer chain. Preferred quantities of the anti-coagulant range from 1 to 5% based on the weight of the aqueous polymerization medium. In addition, a small amount of iron, from 5 to 20 parts per million may be added to the polymerization mixture to enhance polymerization rates.

In a preferred procedure for carrying out the present invention a reaction mixture comprising distilled or demineralized water, to which has been added small amounts of water-soluble peroxygen polymerization initiator, a fluoroalkanoic acid dispersing agent, and a quantity of mineral oil, is charged into a reaction vessel. The vessel is evacuated and 0.01 to 10 mol percent of the monomer of the stabilizing agent is charged with tetrafluoroethylene until a suitable pressure, e.g., about 400 lbs./sq. in. is attained. The closed vessel is then heated to about 80° C. with agitation while tetrafluoroethylene is continuously added to maintain the desired pressure.

The polymerization is continued until the desired amount of monomer has been polymerized. On separating the saturated hydrocarbon from the reaction mixture, there is obtained a colloidal dispersion of polytetrafluoroethylene containing up to 35% solids.

The invention is illustrated in further detail by the following examples, in which the proportions of reactants are expressed in parts by weight unless otherwise stated.

*Example I*

Into a stainless steel vessel having a capacity of one gallon was charged 1600 grams of deoxygenated water, 1.6 grams of disuccinic acid peroxide, 8 grams of ammonium perfluorocaprylate, 100 ml. of a commercially available mineral oil, and 5 parts per million of iron based on the weight of the water. The reaction vessel was evacuated and heated to approximately 85° C. Specified amounts of hydrogen listed in the table below were injected into the reaction mixture. The vessel was then pressured with tetrafluoroethylene to 400 lbs./sq. in. and polymerization was initiated by agitating the reaction mixture. Pressure and temperature were maintained during polymerization, which was continued until the desired solids content was reached. The reaction mixture was cooled to room temperature and excess monomer was removed. The reaction mixture was then separated from the mineral oil and filtered. The solids content of the dispersion was measured by the specific gravity of the dispersion. The stability of the dispersion was determined by agitating the dispersion at 500 revolutions per minute and measuring the time required for coagulation. The coagulated polymer was washed and dried. The polymer was molded into 1" x 3" sheets weighing 25 grams, which were then sintered at 350° C., for a period of 30 minutes in an air oven. The specific gravity of the polymer was determined from the sintered sheets. The sintered sheets were heated to 350° C. in a stream of humid air which was then passed through water in which the hydrolyzable fluorine compounds were adsorbed. The fluoride ion concentration of the water was determined by standard titration methods. From the fluoride ion concentration the fluoride evolution of the polymer was determined. Although the fluoride evolution does not necessarily measure the quantity of all degradation products formed from the heated polymer sample, i.e., only those which are hydrolyzable, a measure of relative degradation is obtained. The fluoride evolution is further a relative measure of the toxic gases released, the exact composition of which is not known.

| Run # | Stabilizer | Stabilizer Quantity in Mole Percent of Monomer | Polymerization Rate, g./l./h.[1] | Solids Content, Percent | Stability, min. | Fluoride Evolution, mg./hr. | Specific Gravity |
|---|---|---|---|---|---|---|---|
| 1 | None | | 790 | 36.4 | 3-5 | 1.3 | 2.2389 |
| 2 | $H_2$ | .15 | 650 | 36.5 | 11 | .66 | 2.2492 |
| 3 | $H_2$ | .30 | 658 | 33.8 | 13 | .32 | 2.2391 |
| 4 | $H_2$ | .45 | 419 | 35.6 | >40 | .48 | 2.2603 |
| 5 | $H_2$ | 1.2 | 331 | 34.0 | >20 | .44 | 2.2646 |
| 6 | $H_2$ | 2.4 | 206 | 33.2 | >40 | .43 | 2.2710 |

[1] G./l./h.=grams of polymer per liter of medium in one hour.

From the above-listed data it can be seen that both the stability of the dispersion is increased and the fluoride evolution at 350° C. is decreased by the addition of hydrogen. However, the data also shows the decrease in the rate of polymerization and the increase in specific gravity. The latter is an indication of decreasing molecular weight. Certain small decreases in molecular weight are desirable, as molding properties are improved by such decreases. However, further decreases in molecular weight will result in brittle polymers, with inferior mechanical properties. Thus both these measurements indicate the necessity to confine the chain-terminating agent to within certain limits so as not to adversely affect the properties of the polymer nor inhibit the polymerization critically. The correlation of the fluoride evolution to the toxicity of the gases released at high temperatures is shown by the following experiments. Samples of run #1 and run #6 were heated to 350° C. over moist air (50% relative humidity) and passed continuously through a bell jar containing two white rats. The experiment was continued until both rats had died or until it was established that the lethal doses of toxic gases could not be reached. The following results were obtained:

| Run # | Stabilizer | Stabilizer Quantity in Mole Percent of Monomer | Fluoride Evolution, mg./h. | Weight Of Sample, g. | Exposure Time, hrs. | Mortality Ratio |
|---|---|---|---|---|---|---|
| 1 | None | | 1.3 | .8 | 2 | 2/2 |
| 6 | $H_2$ | 2.4 | .43 | 10.6 | 6 | 0/2 |

The results indicate that, although the weight of the sample containing no chain-terminating agent was less than one-tenth of the hydrogen capped polymer, the lethal doses of toxic gases had not been reached in after 6 hours in the case of the hydrogen capped polymer, whereas in the uncapped polymer the lethal doses had been reached after two hours, killing both rats.

*Example II*

Into a stainless steel vessel having a capacity of one gallon was charged 1600 ml. of deoxygenated water, 1.6 gram of disuccinic acid peroxide, 8 grams of ammonium perfluorocaprylate, 100 ml. of "Kaydol," a commercially available mineral oil, and 5 parts per million of iron based on the weight of the water. The reaction vessel was evacuated and heated to a temperature indicated in the table below. Specified amounts of methane listed in the table were injected into the reaction vessel. The vessel was then pressured with tetrafluoroethylene to 400 lbs./sq. in. and polymerization was initiated by agitating the reaction mixture. Pressure and temperature were maintained during the polymerization, which was continued until a dispersion of the desired solids was reached. The reaction mixture was cooled to room temperature and excess monomer was removed. The reaction mixture was then separated from the mineral oil and filtered and percentage of coagulum determined. The solids content of the dispersion was measured by the specific gravity of the dispersion. The stability of the dispersion was determined by agitating a sample of the dispersion at 500 revolutions per minute and measuring the time required until coagulation occurred.

| Run # | Stabilizer | Stabilizer Quantity in Mole Percent of Monomer | Reaction Temperature, °C. | Polymerization Rate, g./l./h.[1] | Solids Content, Percent | Coagulum, Percent | Stability |
|---|---|---|---|---|---|---|---|
| 1 | None | | 85-90 | 275 | 38.8 | 0.7 | 2 min., 45 sec. |
| 2 | None | | 85-88 | 428 | 24.8 | 0.64 | 4 min. |
| 3 | $CH_4$ | 0.410 | 85 | 98 | 25.7 | 0 | 36 min., 20 sec. |
| 4 | $CH_4$ | 0.037 | 85 | 312 | 28.3 | 0 | 8 min., 30 sec. |
| 5 | $CH_4$ | 0.029 | 85 | 365 | 32.0 | 0 | 6 min. |
| 6 | $CH_4$ | 0.020 | 85-87 | 270 | 37.0 | 0 | 6 min., 15 sec. |
| 7 | $CH_4$ | 0.0008 | 86 | 301 | 35.8 | 0 | 6 min. |

[1] G./l./h.=grams of polymer formed in one liter of medium in one hour.

As can be seen from the tabulated results, the stability of tetrafluoroethylene dispersion is significantly increased and coagulum formation is prevented. However, the addition of excess quantities of methane will tend to inhibit the polymerization.

*Example III*

Into a 330 ml. platinum line pressure vessel was charged 200 grams of deoxygenated water containing 0.0125% by weight of water of ammonium persulfate. The pressure vessel was evacuated and varying amounts of a chain-terminating agent, as tabulated below, was added. The reaction vessel was heated to 85° C. and pressured with tetrafluoroethylene until a pressure of 400 lbs./sq. in. was obtained. Maintaining that pressure, and temperature, the reaction mixture was agitated for a period of 30 minutes. The reaction vessel was cooled to room temperature, excess monomer was removed, and the resulting polymer was filtered and dried.

The polymer was molded into small 1" x 3" sheets approximately 65 mil thick and weighing 25 grams by first preforming the sheet and then sintering it at a temperature of 350° C. for a period of 30 minutes in an air oven. The specific gravity of the sheets was determined and the thermal stability of the sheet was measured by the fluoride evolution at 350° C. in moist air. As has been shown, the fluoride evolution is a relative measure of the toxic gases released, the exact composition of which is not known. The following results were obtained:

| Run # | Stabilizer | Stabilizer Quantity in Mole Percent of Monomer | Polymer Yield in g. | Rate of Polymerization in g./l./h.[1] | Specific Gravity | Fluoride Evolution in mg./h. |
|---|---|---|---|---|---|---|
| 1 | None | | 123.1 | 1,500 | 2.2760 | 2.2 |
| 2 | $H_2$ | 0.5 | 71.9 | 400 | 2.2710 | 0.37 |
| 3 | $CH_4$ | 0.5 | 87.6 | 800 | 2.2773 | 0.4 |
| 4 | $H_2CF_2$ | 0.5 | 67.7 | 400 | 2.2738 | 0.38 |
| 5 | $CHF_3$ | 0.5 | 94 | 1,000 | 2.2264 | |
| 6 | $CH_3-CHF_2$ | 0.5 | 67 | 300 | 2.2756 | |
| 7 | $C_2H_6$ | 0.05 | 60 | 335 | 2.2754 | |

[1] G./l./h.=grams of polymer formed in one liter of medium in one hour.

From the results, listed in the above table, it can be seen that the fluoride evolution is significantly decreased through the addition of the stabilizing agents employed, indicating the improved thermal stability of the polymers made. The small variations in the specific gravity of the polymers made with the stabilizing agent as compared to the specific gravity of the standard polymer containing no additive shows that the polymers made with the additives are high molecular weight polymers.

The above examples have illustrated that the stabilizing agents of the present invention improve the thermal stability and the dispersion properties of polytetrafluoroethylene without decreasing the molecular weight of the polymer.

The improvement in the aqueous polymerization of tetrafluoroethylene obtained by the process of the present invention is in general independent of the methods employed. The stabilizing agents of the present invention are effective in improving the thermal stability of the polymer in the presence or absence of dispersing agents, anti-coagulants or catalyst promoters. A wide range of polymer catalysts may be used with the stabilizing agents of the present invention.

The present invention is primarily concerned with the polymerization of tetrafluoroethylene. However, it is not restricted to the formation of homopolymers of tetrafluoroethylene, as it is entirely operative and may be used advantageously in the formation of interpolymers of tetrafluoroethylene with other polymerizable compounds such as ethylene, hexafluoropropylene, perfluorobutene, chlorotrifluoroethylene, vinyl fluoride, vinylidene fluoride, and similar compounds copolymerizable with tetrafluoroethylene and containing a terminal carbon-to-carbon double bond. The invention is further applicable to the polymerization of other perfluorinated monomers.

The ratio of the aqueous medium to the monomer may be varied over a wide range, particularly when it is desirable to prepare granular, non-dispersed polytetrafluoroethylene. In preparing aqueous dispersions of polytetrafluoroethylene, the ratio of the monomer to the aqueous medium should be such that the resulting dispersion will have a solids content from 15 to 70%. At lower concentrations, the equipment is not fully utilized and, at higher concentrations, coagulation of the polymer occurs.

The polytetrafluoroethylene of the present invention may be used in any or all equipment used in the fabrication of this polymer. The lower toxicity of end-capped polytetrafluoroethylene makes it possible to use and fabricate the polymer at even higher temperatures than was heretofore possible. The aqueous colloidal dispersions of polytetrafluoroethylene of the present invention are useful for fabricating the polymers into a variety of forms. Films can be cast by baking flow-outs, and in a similar manner coatings of the polymer can be applied to metal, fabric, wood and ceramics. Coatings on metal in the form of wire, foils, materials handling equipment such as chemical reactors and pipe lines, and structural forms are of particular value for their inertness to moisture and corrosive chemicals, solvents, and electrical and mechanical stresses. Fabrics impregnated with the dispersions have unique stability and other desirable properties such as flexibility, high dielectric strength and impermeability. The polymer when coagulated may be molded by powder metallurgy techniques or extruded into films, pipes and other shapes by adding a lubricant and extruding at room temperature, followed by sintering.

As many apparently widely different embodiments of this invention may be made without departing from the spirit thereof it is to be understood that the invention is not limited to the specific embodiments thereof except as defined in the appended claims.

We claim:
1. A process for preparing aqueous dispersion of polytetrafluoroethylene which comprises contacting, at a temperature of 0° to 100° C., tetrafluoroethylene with an aqueous medium, having therein dissolved a water-soluble polymerization catalyst and a salt of a polyfluoroalkanoic acid as a dispersing agent, in the presence of an insoluble saturated hydrocarbon having more than 12 carbon atoms which is liquid at polymerization temperatures and in the presence of 0.01 to 2.5 mol percent of the monomer of hydrogen.

2. The process as set forth in claim 1 wherein the polymerization catalyst is disuccinic acid peroxide.

3. The process as set forth in claim 1 wherein the dispersing agent is ammonium perfluorocaprylate.

4. In a process for polymerizing tetrafluoroethylene in an aqueous medium to high molecular weight polytetrafluoroethylene, the step which comprises adding hydrogen to the reaction mixture prior to polymerization, said hydrogen being employed in a quantity of 0.01 to 2.5 mol percent of the tetrafluoroethylene, and recovering a polymer of improved thermal stability.

5. The process as set forth in claim 4 wherein the catalyst is disuccinic acid peroxide.

6. The process as set forth in claim 4 wherein the catalyst is ammonium persulfate.

References Cited in the file of this patent

UNITED STATES PATENTS

| | | |
|---|---|---|
| 2,600,821 | Wrightson | June 17, 1952 |
| 2,612,484 | Bankoff | Sept. 30, 1952 |
| 2,662,065 | Berry | Dec. 8, 1953 |
| 2,666,042 | Nozaki | Jan. 12, 1954 |
| 2,750,350 | Kroll | June 12, 1956 |